United States Patent [19]
Mattox et al.

[11] 3,864,112
[45] Feb. 4, 1975

[54] METHOD OF FORMING A GLASS-CERAMIC TO METAL SEALS

[75] Inventors: Douglas M. Mattox; Joseph W. Toth, both of Pittsburgh, Pa.

[73] Assignee: Westinghouse Electric Corporation, Pittsburgh, Pa.

[22] Filed: Oct. 31, 1973

[21] Appl. No.: 411,542

[52] U.S. Cl............................. 65/43, 65/49, 65/59
[51] Int. Cl............................................. C03c 27/04
[58] Field of Search............................ 65/43, 49, 59

[56] References Cited
UNITED STATES PATENTS
1,268,647  6/1918  Van Keuren............................ 65/43
3,328,145  6/1967  McMillan et al. ..................... 65/59

Primary Examiner—Arthur D. Kellogg
Attorney, Agent, or Firm—D. P. Cillo

[57] ABSTRACT

An insulating material, selected from glass or glass-ceramic, is bonded to a metal member, having a coefficient of thermal expansion between about 5–18 × $10^{-6}$ in/in°C, by: first applying a coating of boron solution comprising 0–10 weight percent $H_3BO_3$ and 10–30 weight percent $Na_2B_4O_7$ to the metal member, and then, applying the insulating material directly to the coated metal member in a manner to form a solid insulating layer, and a boron glass coating about 25–150 microns thick consisting essentially of about 30–50 weight percent $Na_2O$ and about 50–70 weight percent $B_2O_3$, the boron coating being disposed between the metal member and the insulating layer.

12 Claims, 2 Drawing Figures

3,864,112

METHOD OF FORMING A GLASS-CERAMIC TO METAL SEALS

BACKGROUND OF THE INVENTION

Glasses, porcelains and glass-ceramics have been used as an insulation for a metal member in bushing applications for capacitors and pole-type power transformers, and as vacuum interrupter enclosures, lightning arrester housings, electric line insulators, and in many other specialty applications as an insulating material. The insulating material-metal conductor seal is accomplished in a variety of ways; usually by using an intermediate metallic sheath member which slides over and contacts the metal conductor, or by pre-glassing the conductor with an intermediate sealing glass layer before applying the insulation.

Direct bonding of porcelain to a conductor is not practical because of the low reactivity between porcelain and normal conductor metals. Glass embedment is usually impractical because of thermal expansion mismatches between insulator glasses and economical conductors.

With the development of the glass-ceramic process, a whole new avenue of material applications emerged, whereby glass technology could be employed in the initial forming of an article, such as an insulated bushing; and then a subsequent special heat treatment would convert the glass article to a crystalline oxide material dispersed in a glass matrix, the composite normally having improved properties. The ability to regulate the crystallizing phase by composition and heat treatment permits the adjustment of physical properties, such as coefficient of thermal expansion and hardness, to suit the application.

While glass-ceramic insulating compositions can be adjusted to adequately match the expansion characteristics of economical conductors, generally the bond strength in glass-ceramic embedments and coatings is quite poor when compared to glass enamel bonding. The strength of such embedments comes from the mechanical interlocking of the metal part in the rigid glass-ceramic, and only in small degree from glass-ceramic to metal interaction.

While an intermediate metallic sheath is easily bonded to glasses, porcelains and glass-ceramics, and also easily bonded to the metal conductor, its inclusion in bushings, lightning arresters and other electrical equipment is both expensive and time consuming.

Methods of sealing the above-mentioned insulating materials to copper, nickel alloy or steel conductors have been tried by: applying a molten $SiO_2$-$Li_2O$-$ZnO$-$B_2O_3$ composition and first forming an intermediate sealing glass layer (McMillan et al, U.S. Pat. No. 3,220,815); fusing a variety of materials, such as zinc, copper borate or borax solutions to first form an intermediate sealing glass layer (Van Keuren, U.S. Pat. No. 1,268,647 and Partridge, "Glass To Metal Seals," Soc. of Glass Tech., England 1949); and fusing a porous $Na_2B_4O_7$ precipitate on unoxidized metal, to form a complex of borax and copper oxide (McCarthy, U.S. Pat. No. 2,422,628). Although these methods have proved effective to varying degrees, improvements in the compositions and simplification of the application methods, to provide a suitable intermediate sealing coating, which is particularly effective for hermetic sealing of metal to glass-ceramics, are needed.

SUMMARY OF THE INVENTION

An insulating material selected from glass or preferably glass-ceramic is bonded to a metal member, having a coefficient of thermal expansion between about $5 \times 10^{-6}$ in/in/°C and $18 \times 10^{-6}$ in/in/°C, and preferably having an oxide layer between about 0.8–10 microns thick, by first applying a coating of a boron containing solution, having a temperature of between about 25°–100°C and comprising 0–10 weight percent $H_3BO_3$ and 10–30 weight percent $Na_2B_4O_7$ to the metal member. The solution is then preferably dried to form a boron containing precipitate coating on the metal member. The insulating material is then applied directly to the coated metal member. The coated metal member is then heated up to about 900°C, in a manner to form a solid insulating layer, and a boron glass coating about 25–150 microns thick consisting essentially of about 30–50 weight percent $Na_2O$ and about 50–70 weight percent $B_2O_3$, the brown coating being disposed between the metal member and the insulating layer.

BRIEF DESCRIPTION OF THE DRAWING

For a better understanding of the invention, reference may be made to the exemplary embodiment, shown in the accompanying drawings in which.

DESCRIPTION OF THE PREFERRED EMBODIMENTS

Figure 1:
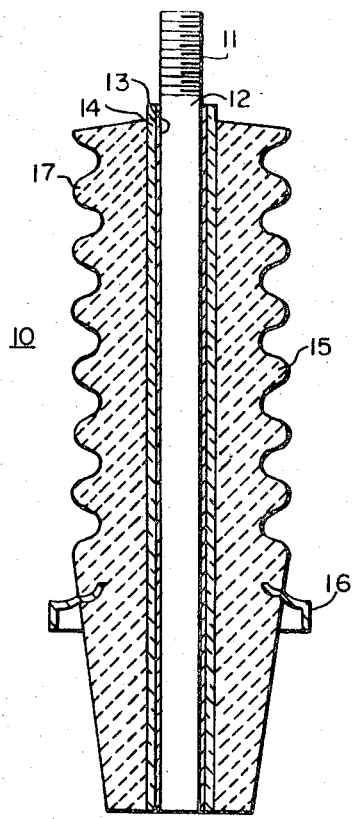
FIG. 1 shows a cross-sectional view of a bushing comprising a smooth surfaced metal conductor, having a boron coating, directly embedded in a rigid glass-ceramic, formed from a reactive glass-ceramic insulating composition, with attached metal fittings.

In applications where glass-ceramic embedment strength comes from the mechanical interlocking of the metal part in the rigid glass-ceramic materials; the compositions and methods of bonding are not particularly critical. In applications where relatively smooth metal surfaces are to be embedded or coated, or where mechanically interlocked designs are not feasible; then the oxidation state of the metal surface, the thickness and method of applying the oxide layer on the metal, and the composition and method of applying the intermediate sealing glass layer to the metal conductor becomes critical.

In the method of this invention, a boron containing solution, capable of being formed into a glass consisting essentially of about 30–50 weight percent $Na_2O$ and 50–70 weight percent $B_2O_3$ and having a coefficient of thermal expansion between about 8 to $20 \times 10^{-6}$ in/in/°C, is applied as a coating about 25–150 microns thick on a metal component. Under 25 microns and the coating will not be uniform and will affect bonding, over 150 microns and an expansion mismatch with the insulating glass might result. The coefficient of expansion of the boron glass must match closely that of the glass or glass ceramic component, which can range from 0 to $17 \times 10^{-6}$ in/in/°C, and that of the metal component, so that good bonding will occur during recrystallization heating. The metal component has a coefficient of thermal expansion between about 5 to $18 \times$ $10^{-6}$ in/in/°C, and preferably an oxide layer having a thickness between about 0.8–10 microns. Over about 10 microns and the oxide can scale off, under about 0.8 microns and the oxide does not appreciably help bonding. An insulating body of a glass, or preferably glass-ceramic component is then united with the coated metal component, as by casting or pressing the molten insulating material into intimate contact with the coated surface, or otherwise sealing it to this surface. Finally the assembly is subjected to a suitable heat treatment, to form a boron glass sealing coating and a solid insulating layer, to provide an intimately bonded, hermetically sealed, insulated assembly.

In the method of this invention, the metal component, such as a brass, copper or steel alloy conductor, is preferably heated to between about 300°–950°C for ½ to 4 hours in an oxidizing atmosphere, such as air, preferably having a dew point between about −23° to 23°C, and cooled in air, to form a dense, highly adherent oxide layer on its surface. This oxidation step may be eliminated in the method of this invention for applications where hermetic sealing of the metal member to the glass-ceramic insulation is not required.

The metal component at a temperature of between about 25°–100°C is coated, preferably by spraying or immersion, with an aqueous, preferably super concentrated boron containing solution, having a temperature between about 25°–100°C. The solution consists essentially of about 0–10 weight percent $H_3BO_3$ and about 10–30 weight percent $Na_2B_4O_7$, wherein the weight ratio $H_3BO_3+Na_2B_4O_7:H_2O$ is between about 1:1.5 and 1:9. Below the dilute weight ratio range and too little boron containing material will be applied to effectively help bonding, above the concentrated range and the application will be difficult because of precipitation. The boron will generally precipitate out of solution below 25°C and the solution will boil at temperature over 100°C.

The coated metal member is then preferably dried in an oven between about 50°–175°C to form a boron containing precipitate. The boric acid and borax are intermixed in solution and then precipitated to provide very fine particles of $H_3BO_3$ and $Na_2B_4O_7$ as a thin uniform coating. The molten insulating melt may then be applied to the dried, coated metal member, which may then be heated between about 500°–900°C for about 2 to 20 hours, and cooled to room temperature over a ½ to 20 hour period, to provide a solid insulating layer covering a glassy 25–150 micron thick coating having a composition consisting essentially of about 30–50 weight percent $Na_2O$ and about 50–70 weight percent $B_2O_3$.

The boron glass film coating is preferably formed during the molten insulating glass pouring and recrystallization heating operations. For example, a metal conductor having a minimal oxide layer could be heated between 65°–100°C and dipped, sprayed or otherwise coated with the cold boron containing solution of this invention, dried to form a boron containing precipitate placed in a suitable mold, and a molten glass, capable of being formed into a glass-ceramic, poured around the coated metal conductor. The coated conductor may be preheated enough to allow better glass envelopment but not enough to melt the boron containing precipitate. The mold and glass could then be cooled to below about 600°C, the mold removed and the metal embedded glass article heated to between about 500°–900°C at a temperature rate effective to simultaneously form the $Na_2O$-$B_2O_3$ intermediate glass coating and the glass-ceramic insulation for the metal component. This method eliminates the necessity of first forming an intermediate glass sealing layer before applying the insulating material melt.

Any insulating glass melt and subsequently crystallized glass-ceramic component, preferably consisting essentially of about 60 to 80 weight percent $SiO_2$, 12 to 20 weight percent $Li_2O$, 1.0 to 6 but preferably 2 to 4 weight percent $P_2O_5$, 0.5 to 7 weight percent of an alkali oxide selected from $K_2O$ and $Na_2O$ or their mixtures, 0 to 20 but preferably 4 to 15 weight percent MgO, 0 to 10 weight percent $Al_2O_3$ 0 to 5 weight percent PbO, 0 to 2 weight percent of a transition metal oxide selected from $Co_3O_4$, $MnO_2$, $Fe_2O_3$, $V_2O_5$ and $WO_3$ or their mixtures and 0 to 1 weight percent $As_2O_3$, is formed and applied directly to the pre-coated metal member. This insulating glass-ceramic will have a coefficient of thermal expansion of between about $7 \times 10^{-6}$ to $13 \times 10^{-6}$ in/in/°C.

In the preferred composition above, the $P_2O_5$ is a nucleating agent essential to catalyze crystallization. The $P_2O_5$ is not used as a glass flux to improve glass melting properties, but is necessary to promote homogeneity of crystallization, and is required for dimensional stability in the article. Compositions containing $P_2O_5$ within the ranges set forth above will uniformly crystallize, while those compositions containing below 1.0 weight percent $P_2O_5$ will randomly crystallize leaving a mottled bumpy appearance. Values over 6 weight percent will cause inhomogeneous crystallization, leaving a streaky appearance. The $P_2O_5$ is essential to prevent slumping or deformation in the casting during the gradient recrystallization step.

The alkali oxide is essential to balance and match the coefficients of thermal expansion of the glass-ceramic material to the metal member which it insulates, by offsetting the high expansion of the crystal phase versus the low expansion of the glass phase to prevent seal stress cracking. It also improves the metal wetting behavior of the glass during casting and promotes crystallization by its effect on viscosity. This component is important because the ceramic to metal bond is produced at high temperatures and thermal expansion matching is a necessity.

The transition metal oxides are reactive metal adherence promoting additions. Particularly useful is $Co_3O_4$ in amounts below 0.5 weight percent to heighten the reactivity of the glassy phase without altering the crystallization of the system.

Preferably the glass melt at between about 1,000°–1,500°C is cast into a static graphite mold or centrifugal type steel mold, which will be preferably preheated to between about 300° to 900°C. The mold contains the coated metal member, which can also be preheated to a temperature of between about 300° to 900°C, but preferably below the melting temperature of the boron containing precipitate coating. The temperature of the glass as it contacts the hot coated metal member in the mold will be between about 650° to 1100°C, but preferably between about 700°–900°C. Of course, glass-ceramic may be applied to the coated metal member by other suitable techniques well known in the enameling art when only a thin glass-ceramic or other type enamel layer is to be applied.

The cast, transparent glass is allowed to cool around the metal member to between about 450°–600°C, in an air atmosphere, to form a thick semi-rigid glass insulating article. The mold, if one is used, is opened and the metal member with surrounding glass layer or housing is placed in a recrystallizing furnace or lehr at a temperature of about 450°–600°C. The glass covered metal member is gradually heated, in an air atmosphere, with a continuous increase of temperature at a rate of about 10°–80°C per hour, without stopping; so that crystal growth is not arrested, until a glass temperature of between about 800°–900°C is reached. Above this rate and generally the glass phase will soften faster than crystallization takes place causing the piece to slump.

The viscosity of the insulating material remains somewhat constant due to the crystallization temperature depleting the glassy phase in the formation of crystals, while the heating causes the glassy phase to become more fluid as the temperature rises. At about 800°C the crystal growth continues at an accelerated rate and the glass becomes an opaque, substantially homogeneous micro-crystalline mass of synthetic ceramic, in a feldspathic glass matrix comprising the uncrystallized portion of the mass. The glass-ceramic covered metal member is held at a temperature of between 800°–900°C for about ½ to 10 hours to insure maximum crystallization, and then allowed to cool to room temperature over about a ½ to 20 hour period. The final recrystallization temperature should not exceed 900°C or the crystals constituting the ceramic phase of the insulation may begin to remelt.

The glass matrix can comprise about 5 to 80 volume percent of the glass-ceramic material, but will preferably be only about 5 to 40 volume percent, i.e., about 60–95 volume percent ceramic crystals. These crystalline ceramic materials have desirable properties which are different from the properties of their original glasses. Due to closely knit, interlocked relationship of the crystals, as a result of being formed in situ, the breaking strength is 2 to 4 times greater than the original glass.

Referring now to FIG. 1 of the drawings, a sealed, insulated article, such as a bushing is shown as 10. The copper, steel or stainless steel conductor 11 is shown having a smooth surface 12 which is covered with oxide layer 13 coated with boron coating 14. The coated conductor does not contact a metal sheath but is directly and intimately bonded to the glass-ceramic insulator casting 15. Also shown are metal fittings 16, such as flanges and end cups, embedded in the casting during molding and water sheds 17.

Figure 2:
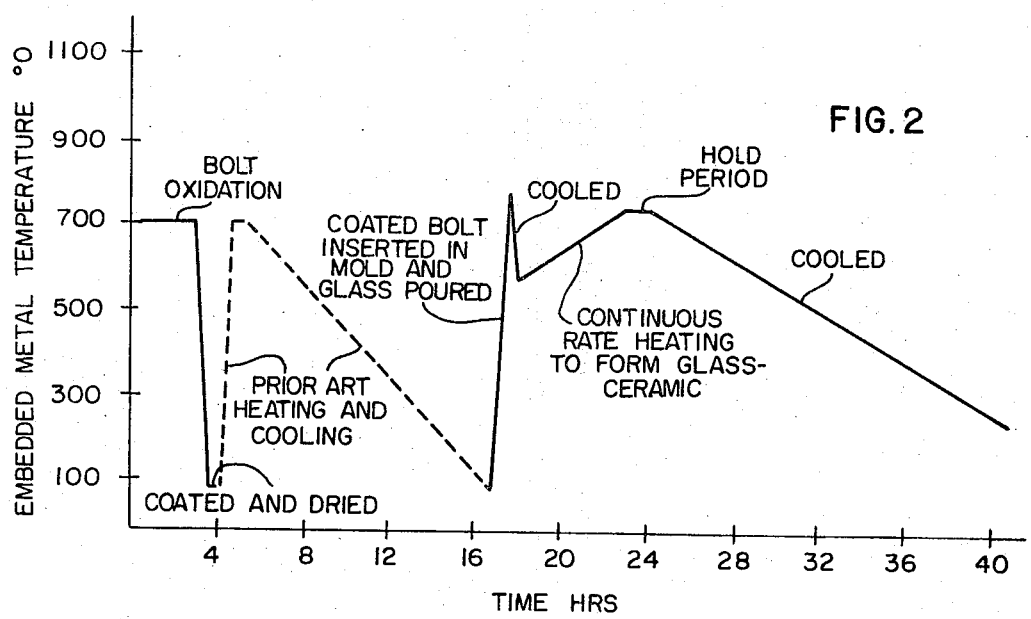
FIG. 2 shows a graph of the metal conductor temperature, in various heat treating schedules; to oxidize the metal, form a boron coating on the metal, apply the glass melt and convert it to a crystalline ceramic in a glassy matrix.

FIG. 2 shows a graphical representation of a typical heating schedule for pre-glassing and forming a glass-ceramic component.

EXAMPLE 1

A glass-ceramic plug insulator with embedded bolt was made. The metal bolt was a type 430 stainless steel having a coefficient of thermal expansion of about $10.4 \times 10^{-6}$ in/in/°C and an annealing temperature range of about 760°–820°C. The bolt was in the configuration of a 1-½-inch-⅛ inch-13 thread screw with a ⅛ inch diameter by ½ inch long unthreaded shank which was ultimately embedded.

The bolt was sandblasted with SiC abrasive and heated in an oven at about 705°C, for about 3 hours in air, to oxidize the metal surface and form a thin, dense oxide layer between about 5–10 microns thick. After heating in the oxidizing atmosphere with a dew point of approximately 20°C, the bolt was cooled in air for about 15–30 minutes.

At a temperature of about 95°C the oxidized bolt was immersed into a boron containing solution preheated to about 80°C. The heated solution was prepared by adding 7.5 gr, 1.3 weight percent, $H_3BO_3$ (Boric Acid) and 100 gr., 19.7 weight percent, $Na_2B_4O_7$ (Anhydrous Borax) to 400 cc, 79 weight percent deionized water. This provided a saturated solution with a weight ratio of solid:water of 1:3.7. The coated metal bolt was removed from the solution and dried in an oven at between 65°C and 95°C for about 5–15 minutes.

The dried bolt was found to be coated with a boron containing precipitate about 25–40 microns thick.

A batch of powdered ingredients was then mixed containing 145.0 gr. $SiO_2$, 65.6 gr. $LiCO_3$, 11.3 gr. $Al(PO_3)_3$, 13.9 gr. $K_2CO_3$, 0.8 gr. $Na_2CO_5$, and 9.0 gr. $Al_2O_3$. This batch material yielded a glass metal material consisting of approximately about 72.02 weight percent $SiO_2$, 13.10 weight percent $Li_2O$, 4.46 weight percent $P_2O_5$, 4.68 weight percent $K_2O$, 0.24 weight percent $Na_2O$ and 5.50 weight percent $Al_2O_3$. The final glass-ceramic material in which the pre-glassed bolt was embedded will have approximately the same composition. The batch materials were placed in a silica crucible and placed in a furnace operating at a temperature of about 1,310°C, and containing silicon carbide resistive heating elements, to melt the batch materials and form a fluid, molten glass having a temperature of about 1310°C. The melt was stirred at ½ hour intervals and left in the furnace for 6 hours.

The molten glass composition was then allowed to cool to about 1260°C. It was then poured into a graphite split mold with a 1 ½ inch inside diameter by 2 inch main cavity, and a ½ inch inside diameter × 1 inch hole in the bottom containing the boron coated bolt, with the unthreaded shank portion of the bolt sticking into the mold cavity. The mold was preheated to about 570°C and the boron coated bolt inserted. After insertion of the boron coated bolt, the molten insulating glass was immediately poured into the mold. The temperature of the glass as it contacted the mold and boron coated bolt was approximately 800°C.

The graphite mold and casting were then placed in an oven operating at about 560°C to allow the glass to further cool. After about 20 minutes the mold was taken from the oven and removed from the glass casting. The glass housing with embedded stainless steel bolt, having a temperature of about 550°C, was then reinserted into the oven and the oven temperature raised so that the glass temperature would continuously increase at a rate of about 40°C/hr. to a final temperature of 750°C. The 200°C temperature, increase was brought about at a continuous gradual rate over 5 hours without stopping, so that crystal growth was not arrested. The insulating glass was converted into a substantially homogeneous micro-crystalline mass of about 80 volume percent ceramic in a glass matrix, having a coefficient of thermal expansion of about $10.5 \times 10^{-6}$ in/in/°C. The specimen was held at 750°C for 75 minutes, cooled to 550°C over about a 6 hour period, held at that temperature for 2 hours, and then allowed to cool to room temperature at the oven's natural cooling rate. The entire process was carried out without the use of an inert atmosphere.

The heating schedule is found as the solid line graph in FIG. 2 of the drawings.

The resulting opaque glass-ceramic plug insulator with attached stainless hardware was not deformed or slumped in any way. The glass-ceramic ($Li_2O-Al_2O_3-SiO_2$) insulating system had a coefficient of thermal expansion of about $11 \times 10^{-6}$ in/in/°C. The stainless steel stud was strongly bonded and intimately attached to the top of the plug insulator and there were no cracks in evidence. The boron coated stud gave every evidence of having reactively formed a strong bond with the glass-ceramic. The insulator was cut through with a carbide wheel for examination of the metal to glass-ceramic interface and did not separate at the interface. The intermediate boron glass layer was formed during molten glass pouring and subsequent recrystallization heating, and had a thickness of about 25-40 microns, a coefficient of thermal expansion of about $18 \times 10^{-6}$ in/in/°C and a composition of about 40 wt percent $Na_2O$ and 60 wt percent $B_2O_3$.

It was found that the boron containing precipitate, formed after coating and drying the super concentrated boric acid-borax solution, would immediately form a suitable glassy intermediate sealing coating layer during the glass pouring step. This eliminates the usual heating step to pre-glass the stud, shown as the dotted line in FIG. 2 and would same time and money in a commercial operation.

EXAMPLE 2

Two glass-ceramic lightning arrester housings with embedded feed through conductors were made. The metal feed through conductors were a type 430 stainless steel having a coefficient of thermal expansion of about $10.4 \times 10^{-6}$ in/in/°C and an annealing temperature range of about 760°-820°C. The conductor were 1 inch in diameter and about 3 inches long.

Both conductors were cleaned first in acetone and then in detergent and water. Following cleaning, the conductors were heated in an oven at about 705°C, for about 3 hours in air, to oxidize the metal surface and form a thin, dense oxide layer between about 5-10 microns thick. After heating in the oxidizing atmosphere with a 20°C dew point, the conductors were cooled in air for about 15-30 minutes.

One of the oxidized conductors was then heated to 93°C and dipped into a boron containing solution preheated to about 79°C. The heated solution was prepared by adding 7.5 gr., 1.3 weight percent $H_3BO_3$ and 100 gr., 19.7 weight percent $Na_2B_4O_7$ to 400 cc, 79 weight percent deionized water. This provided a saturated solution with a weight ratio of solid:water of 1:3.7. The coated metal conductor was removed from the solution and dried in an oven at between 65° and 95°C for about 5-15 minutes.

The dried bolt was found to be coated with a hydrous boron containing precipitate about 25-40 microns thick. The bolt in this case was then heated to 760°C over about a 5-10 minute period and held there for about 20 minutes, to melt the precipitated coating. It was then cooled over a 12 hour period, to provide a conductor with an intimately bonded, distinct glassy film, about 25-40 microns thick, having a coefficient of thermal expansion of about $18 \times 10^{-6}$ in/in/°C, and a composition of about 40 weight percent $Na_2O$ and 60 weight percent $B_2O_3$. The other conductor was not treated to coat it with a boron containing compound.

A batch of powdered ingredients was then mixed containing 2,900 gr. $SiO_2$, 1312 gr. $Li_2CO_3$, 16.4 gr. $Na_2CO_3$, 227 gr. $Al(PO_3)_3$, 227 gr. $K_2CO_3$, and 180 gr. $Al_2O_3$. This batch material yielded a glass melt material consisting of approximately about 72.02 weight percent $SiO_2$, 13.10 weight percent $Li_2O$, 4.46 weight percent $P_2O_5$, 4.68 weight percent $K_2O$, 0.24 weight percent $Na_2O$ and 5.50 weight percent $Al_2O_3$. The final glass-ceramic insulating material in which the pre-glassed bolt was embedded will have approximately the same composition. The batch materials were placed in a silica crucible and placed in a furnace operating at a temperature of about 1310°C, and containing silicon carbide resistive heating elements, to melt the batch materials and form a fluid, molten glass having a temperature of about 1310°C. The melt was stirred at ½ hour intervals and left in the furnace for 6 hours.

The molten glass composition was then allowed to cool tto about 1100°C. It was then poured into a graphite split mold for 7 KV lightning arrester housings having a 2-inch inside diameter and having a hole in the bottom containing the conductors, which stuck into the mold cavity. One casting contained the $Na_2O-B_2O_3$ coated conductor and the other casting contained the conductor that was not pre-glassed. In each case the mold was preheated to about 450°C and the bolt inserted at a temperature of about 750°C. After insertion of the bolt, the molten glass was immediately poured into the mold. The temperature of the glass as it contacted the mold and bolt was approximately 700°C.

Each graphite mold and casting was then placed in an oven operating at about 550°C to allow the glass to further cool. After about 10 minutes mold was taken from the oven and removed from the glass castings. The glass housing with embedded stainless steel conductors, having a temperature of about 550°C, was then reinserted into the oven. The oven temperature raised so that the glass temperature would continuously increase at a rate of about 40°C/hr. to a final temperature of 750°C. The 200°C temperature, increase was brought about at a continuous gradual rate over 5 hours without stopping, so that crystal growth was not arrested. The insulating glass was converted into a substantially homogeneous micro-crystalline mass of about 80 volume percent ceramic in a glass matrix. The specimens were held at 750°C for 75 minutes, cooled at 35°C/hr to 540°C, held 1 hour at 540°C and then allowed to slowly cool to room temperature. The entire process was carried out without the use of an inert atmosphere.

The resulting opaque glass-ceramic housings with attached stainless hardware were not deformed or slumped in any way. The glass-ceramic ($Li_2O-Al_2O_3-SiO_2$) insulating system had a coefficient of thermal expansion of about $11 \times 10^{-6}$ in/in/°C. The stainless steel conductors appeared strongly bonded and attached to the top of the housings and there were no cracks in evidence.

Both housings were cut through with a carbide wheel to the glass-ceramic to metal seal region. Samples were mounted, ground and polished for metallographic examination with a 50 power microscope by the Nomarski interference contrast technique which accentuates surface topography.

In the case of samples where no borating treatment was used on the conductor, a cavity substantially along the entire length of the conductor was evident at the glass-ceramic to metal interface. This indicated relatively poor bonding, inadequate glass-ceramic to metal reactivity and possible oxide scale off, all denoting relatively poor adherence, although the bond seemed adequate prior to cutting. In the case of the sample where a $Na_2O$-$B_2O_3$ glassy intermediate coating was formed on the conductor, no cavity was evident at the interface, but a smooth continuous transition from the metal to glass-ceramic region was observed, evidencing excellent seal quality. The $Na_2O$-$B_2O_3$ glass coating formed in EXAMPLE 1 would have similar excellent seal quality with no cavities.

EXAMPLE 3

Two glass-ceramic lightning arrester housings with embedded feed through conductors were made. The metal feed through conductors were a type 430 stainless steel having a coefficient of thermal expansion of about $10.4 \times 10^{-6}$ in/in/°C and an annealing temperature range of about 760°–820°C. The conductors were 1 inch in diameter and about 3 inches long.

Both conductors were sandblasted with SiC abrasive and then cleaned, first in acetone and then in dilute HCl for 1 minute followed by a deionized water rinse and another acetone wash. Following cleaning the conductors were heated in an oven at about 540°C for about 10 minutes in air, to form a minimal oxide layer about 5 microns thick.

One of the conductors was then cooled to 93°C and dipped into a boron containing solution preheated to about 79°C. The heated solution was prepared by adding 7.5 gr., 1.3 weight percent $H_3BO_3$ and 100 gr., 19.7 weight percent $Na_2B_4O_7$ to 400 cc, 79 weight percent deionized water. This provided a saturated solution with a weight ratio of solid:water of 1:3.7. The coated metal conductor was removed from the solution and dried in an oven between 65° and 95°C for about 5–15 minutes. The dried bolt was found to be coated with a fine boron containing precipitate containing $H_3BO_3$ and $Na_2B_4O_7$ about 25–40 microns thick. The bolt was not baked as in EXAMPLE 2. The other conductor was not treated to coat it with a boron containing compound.

A batch of powdered ingredients was then mixed containing 4,750 gr. $SiO_2$, 2160 gr. $Li_2CO_3$, 226.5 gr. $Al(PO_3)_3$, 456 gr. $K_2CO_3$, 332 gr. $Al_2O_3$ and 13 gr. $As_2O_3$. This batch material yielded a glass melt material consisting of approximately about 73.0 weight percent $SiO_2$, 13.45 weight percent $Li_2O$, 2.80 weight percent $P_2O_5$, 4.77 weight percent $K_2O$, 5.78 weight percent $Al_2O_3$ and 0.2 weight percent $As_2O_3$. The final glass-ceramic material in which the pre-glassed bolt was embedded will have approximately the same composition. The batch materials were placed in a silica crucible and placed in a furnace operating at a temperature of about 1,310°C, and containing silicon carbide resistive heating elements, to melt the batch materials and form a fluid, molten glass having a temperature of about 1,310°C. The melt was stirred at ½ hour intervals and left in the furnace for 6 hours.

The molten glass composition was then allowed to cool to about 1,100°C. Sequential castings were then made by pouring it into a steel centrifugal casting mold for a 10 KV lightning arrester housing which would provide a 10 inch specimen with a 1.6 inch tapered bore after spinning. At the bottom of the mold was a ⅜ inch hole containing the conductor, which protruded into the mold cavity. Prior to the casting the one mold contained the boron coated but not yet glassed conductor and for the second casting the other mold contained the conductor that was not pre-coated. The mold was preheated to about 450°C and the bolts were preheated and inserted at a temperature of about 300°C. At this temperature there was no substantial boron glass formation; the bolt being preheated to improve envelopment and adherence during the subsequent glass melt pouring step. After insertion of the bolt, the molten insulating glass was immediately poured into the mold and then spun. The temperature of the glass as it contacted the mold and bolts was approximately 700°C. The molds were spun for approximately 90 seconds at 150 rpm and then brought to a stop.

The molds were immediately opened and the piece removed with asbestos covered tongs and transferred to the crystallizing oven at a temperature of 550°C. After all castings were completed the oven temperature was raised so that the glass temperature would continuously increase at a rate of about 40°C/hr. to a final temperature of 750°C. The 200°C temperature increase was brought about at a continuous gradual rate over 5 hours without stopping, so that crystal growth was not arrested. The insulating glass was converted into a substantially homogeneous microcrystalline mass of about 80 volume percent ceramic in a glass matrix. The specimen was held at 750°C for 75 minutes, and cooled at 35°C/hr. to 540°C, held one hour at 540°C and then allowed to slowly cool to room temperature. The entire process was carried out without the use of an inert atmosphere.

The resulting opaque glass-ceramic housings with attached stainless hardware were not deformed or slumped in any way. The glass-ceramic ($Li_2O$-$Al_2O_3$-$SiO_2$) insulating system had a coefficient of thermal expansion of about $11 \times 10^{-6}$ in/in/°C. The stainless steel conductors seemed strongly bonded and attached to the top of the housings and there were no cracks in evidence.

Both housings were broken open at the seal area for visual inspection. In the case of the seal where no boron pre-coating treatment was used on the conductor, there was little evidence of metal to glass-ceramic adherence. In the case of the sample where a boron containing coating was applied to the metal prior to glass pouring, the boron seal broke in the glassy region leaving a large glass-ceramic band around the seal area which did not break away indicating excellent adherence. On further inspection of the metal-glass interface, an intermediate glassy layer could be faintly observed between the metal and glass-ceramic, indicating that the $Na_2O$-$B_2O_3$ glass layer need not be formed prior to pouring the glass melt, but may be formed during the glass pouring and subsequent crystallization steps. The intermediate boron glass layer had a thickness of about 25–40 microns, a coefficient of thermal expansionn of about $18 \times 10^{-6}$ in/in/°C and a composition of about 40 wt percent $Ns_2O$ and 60 wt percent $B_2O_3$.

We claim:

1. A method of bonding an insulating material to a metal member comprising the steps of:

A. applying a coating of a boron containing aqueous solution having a temperature of between about 25°–100°C and comprising 0–10 weight percent $H_3BO_3$ and 10–30 weight percent $Na_2B_4O_7$, wherein the weight ratio $H_3BO_3 + Na_2B_4O_7:H_2O$ is between about 1:1.5 and 1:9, to a metal member having a coefficient of thermal expansion between about 5 × 10$^{-6}$ in/in/°C to 18 × 10$^{-6}$ in/in/°C;

B. drying the applied solution to form a boron precipitate coating having a thickness of between about 25–150 microns;

C. applying a molten glass insulating material, directly to the coated metal member, and heating the insulating material and coated metal member up to a temperature of between about 500°–900°C, at a temperature rate effective to simultaneously form a solid insulating layer selected from the group consisting of glass, and glass-ceramic having a coefficient of thermal expansion between about 0 to 17 × 10$^{-6}$ in/in/°C, and a boron glass coating about 25–150 microns thick consisting essentially of 30–50 weight percent Na$_2$O and 50–70 weight percent B$_2$O$_3$, having a coefficient of thermal expansion between about 8 × 10$^{-6}$ in/in/°C to 20 × 10$^{-6}$ in/in°C, between the metal member and the insulating layer; and then D. cooling the insulated metal member to room temperature.

2. The method of claim 1 wherein the insulating layer is a glass-ceramic consisting essentially of about 60–80 weight percent SiO$_2$, 12–20 weight percent Li$_2$O, 1.0–6 weight percent P$_2$O$_5$, 0.5–7 weight percent of an alkali oxide selected from the group consisting of K$_2$O and Na$_2$O and their mixtures, 0–20 weight percent MgO, 0–10 weight percent Al$_2$O$_3$, 0–5 weight percent PbO, 0–2 weight percent of a transition metal oxide selected from the group consisting of Co$_3$O$_4$, MnO$_2$, Fe$_2$O$_3$, V$_2$O$_5$ and WO$_3$ and their mixtures and 0–1 weight percent As$_2$O$_3$.

3. The method of claim 2 wherein the glass-ceramic is formed by applying a molten glass of the same composition as the glass-ceramic to the coated metal member, cooling the glass to a temperature of below about 600°C and then heating the glass and coated metal member up to a temperature of about 900°C at a rate of about 10°–80°C per hour in an air atmosphere, to form a substantially homogeneous micro-crystalline mass of ceramic in a glass matrix.

4. The method of claim 3 where before step (A), the metal member which is a conductor selected from the group consisting of uncoated copper, steel and stainless steel, having a coefficient of thermal expansion between about 5 × 10$^{-6}$ in/in/°C to 18 × 10$^{-6}$ in/in/°C, is heated in an oxidizing atmosphere to form an oxide coating thereon having a thickness between about 0.8–10 microns.

5. The method of claim 4 wherein the metal member is maintained at a temperature between about 65°–100°C during application of the boron containing solution.

6. The method of claim 4 wherein the molten glass which subsequently forms the glass-ceramic is applied by pouring the glass into a mold containing the coated metal member, to embed the coated metal member in the glass, and the mold is removed after the glass is cooled below 600°C.

7. The method of claim 6 wherein the metal member has a coefficient of thermal expansion of between about 5 × 10$^{-6}$ in/in/°C and 13 × 10$^{-6}$ in/in/°C and the oxide coating is formed in an atmosphere having a dew point between about −23° to 23°C.

8. A method of embedding a metal member in an electrically insulating glass-ceramic material comprising the steps of:

A. applying a coating of an aqueous boron containing solution having a temperature of between about 25°–100°C and comprising 0–10 weight percent H$_3$BO$_3$ and 10–30 weight percent Na$_2$B$_4$O$_7$, wherein the weight ratio H$_3$BO$_3$+Na$_2$B$_4$O$_7$:H$_2$O is between about 1:1.5 and 1:9, to a metal member having a coefficient of thermal expansion between about 5 × 10$^{-6}$ in/in/°C to 18 × 10$^{-6}$ in/in/°C and an oxide coating having a thickness between about 0.8–10 microns; and then B. drying the applied solution at a temperature between about 50°–175°C to form a boron precipitate coating on the oxidized metal member having a thickness of between about 25–150 microns; and then C. placing the coated metal member in a mold; and then D. pouring a fluid glass composition consisting essentially of about 60–80 weight percent SiO$_2$, 12–20 weight percent Li$_2$O, 1.0–6 weight percent P$_2$O$_5$, 0.5–7 weight percent of an alkali oxide selected from the group consisting of K$_2$O and Na$_2$O and their mixtures, 0–20 weight percent MgO, 0–10 weight percent Al$_2$O$_3$, 0–5 weight percent PbO, 0–2 weight percent of a transition metal oxide selected from the group consisting of Co$_3$O$_4$, MnO$_2$, Fe$_2$O$_3$, V$_2$O$_5$ and WO$_3$ and their mixtures and 0–1 weight percent As$_2$O$_3$ into the mold containing the coated metal member, to embed the metal member in the glass; and then E. cooling the glass to a temperature below about 600°C and then removing the mold; and then F. heating the glass and coated metal member up to a temperature of about 900°C at a rate of about 10°–80°C per hour, to form a glass-ceramic from the glass composition having a coefficient of thermal expansion between about 7 × 10$^{-6}$ to 13 × 10$^{-6}$ in/in/°C, said glass-ceramic being a substantially homogeneous micro-crystalline mass of ceramic in a glass matrix, and a boron glass coating between about 25–150 microns thick having a coefficient of thermal expansion between about 8 × 10$^{-6}$ to 20 × 10$^{-6}$ in/in/°C and consisting essentially of about 30–50 weight percent Na$_2$O and about 50–70 weight percent B$_2$O$_3$, between the metal member and the glass-ceramic insulation; and finally G. cooling the glass-ceramic insulated metal member to room temperature to provide a hermetically sealed insulated article.

9. The method of claim 8, wherein the glass composition contains 2–4 weight percent P$_2$O$_5$ and 4–15 weight percent MgO.

10. The method of claim 9, wherein the glass composition contains 0–0.5 weight percent of Co$_3$O$_4$ transition metal oxide.

11. The method of claim 9 wherein the mold is a centrifugal casting mold which is spun after the fluid glass composition is poured in step (D).

12. The method of claim 9, wherein the metal member is a conductor selected from the group consisting of copper, steel and stainless steel having a coefficient of thermal expansion between about 5 × 10$^{-6}$ in/in/°C to 18 × 10$^{-6}$ in/in/°C.

* * * * *